US012633174B2

(12) United States Patent
Im et al.

(10) Patent No.: US 12,633,174 B2
(45) Date of Patent: May 19, 2026

(54) METHOD AND APPARATUS FOR TRANSMITTING SPEED INFORMATION OF VEHICLE

(71) Applicant: HYUNDAI MOBIS CO., LTD., Seoul (KR)

(72) Inventors: Sang Eon Im, Yongin-si (KR); Hyun Cheol Jeon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 87 days.

(21) Appl. No.: 18/753,157

(22) Filed: Jun. 25, 2024

(65) Prior Publication Data

US 2025/0046128 A1 Feb. 6, 2025

(30) Foreign Application Priority Data

Jul. 31, 2023 (KR) ........................ 10-2023-0099731

(51) Int. Cl.
*G07C 5/00* (2006.01)
*H04L 12/40* (2006.01)

(52) U.S. Cl.
CPC .............. *G07C 5/008* (2013.01); *H04L 12/40* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2006/0064240 A1* | 3/2006 | Wurth | ................... B60C 23/061 701/1 |
| 2016/0263998 A1* | 9/2016 | Induni | ..................... G01S 19/14 |
| 2023/0128325 A1 | 4/2023 | Park | |

OTHER PUBLICATIONS

Extended European Search Report issued on Jan. 7, 2025 in European Patent Application No. 24186723.3.

* cited by examiner

*Primary Examiner* — Abdhesh K Jha
(74) *Attorney, Agent, or Firm* — Morgan, Lewis & Bockius LLP

(57) ABSTRACT

An embodiment method for transmitting speed information of a vehicle using an apparatus for transmitting speed information of the vehicle includes receiving a first speed information of the vehicle from an electronic stability control (ESC) device, the first speed information being information based on a plurality of wheels of the vehicle, averaging the first speed information, converting the averaged first speed information into a second speed information of the vehicle, based on a first period, and outputting the second speed information, based on a second period and a minimum output frequency, in which the first speed information is a digital signal and the second speed information is an analog signal.

11 Claims, 11 Drawing Sheets

*110*

*120*

| COMMUNICATION DATA | SPEED VALUE(km/h) |
|---|---|
| 1 | 0.03125 |
| 2 | 0.0625 |
| . . . | . . . |
| 80 | 2.5 |
| . . . | . . . |
| 800 | 25 |
| . . . | . . . |
| 1600 | 50 |
| . . . | . . . |
| 16000 | 500 |

MCU

| FREQUENCY (Hz) | SPEED VALUE(km/h) |
|---|---|
| 1 | 0.125 |
| 2 | 0.25 |
| . . . | . . . |
| 20 | 2.5 |
| . . . | . . . |
| 200 | 25 |
| . . . | . . . |
| 400 | 50 |
| . . . | . . . |
| 4000 | 500 |

| Time | COMMUNICATION DATA | SPEED VALUE (km/h) |
|---|---|---|
| 0ms | 3 | 0.09375 |
| 50ms | 5 | 0.15625 |
| 100ms | 15 | 0.46875 |
| 150ms | 50 | 1.5625 |
| 200ms | 80 | 2.5 |
| 250ms | 150 | 4.6875 |
| 300ms | 200 | 6.25 |
| 350ms | 70 | 2.1875 |
| 400ms | 40 | 1.25 |
| 450ms | 40 | 1.25 |

MCU

| Time | COMMUNICATION DATA | ACCUMULATED SPEED VALUE | RESULTANT VALUE | REMAINDER | Pulse |
|---|---|---|---|---|---|
| 0ms | 3 | 3 | 0 | 3 | 0Hz |
| 50ms | 5 | 8 | 0 | 8 | 0Hz |
| 100ms | 15 | 23 | 0 | 23 | 0Hz |
| 150ms | 50 | 73 | 0 | 73 | 0Hz |
| 200ms | 80 | 153 | 1 | 73 | 20Hz |
| 250ms | 150 | 223 | 2 | 63 | 40Hz |
| 300ms | 200 | 263 | 3 | 23 | 60Hz |
| 350ms | 70 | 93 | 1 | 13 | 20Hz |
| 400ms | 40 | 53 | 0 | 53 | 0Hz |
| 450ms | 40 | 93 | 1 | 13 | 20Hz |

Oms                    45ms 50ms                    100ms

METHOD AND APPARATUS FOR TRANSMITTING SPEED INFORMATION OF VEHICLE

CROSS-REFERENCE TO RELATED APPLICATIONS

This application is based on, and claims priority from, Korean Patent Application Number 10-2023-0099731, filed Jul. 31, 2023, the disclosure of which is incorporated by reference herein in its entirety.

TECHNICAL FIELD

The present disclosure relates to a method and apparatus for transmitting speed information of vehicle, and more particularly, to a method and apparatus by which an electronic stability control (ESC) device transmits speed information of vehicle to a micro-controller unit (MCU) using a digital signal and the MCU transmits speed information of the vehicle to a global navigation satellite system (GNSS) using an analog signal.

BACKGROUND

The statements in this section merely provide background information related to the present disclosure and do not necessarily constitute prior art.

An electronic stability control (ESC) device is a device that controls the posture of a vehicle to prevent the vehicle from skidding and helps ensure stable driving. A global navigation satellite system (GNSS) is a satellite navigation system that calculates a position, altitude, and speed of moving objects throughout the Earth using artificial satellites. The ESC device or cluster in the vehicle transmits speed information of vehicle to the GNSS using analog signals. Here, the speed information of the vehicle corresponds to a frequency input as a hardwire signal. When there is no satellite signal, the GNSS performs dead reckoning (DR) calculation using the frequency.

When the ESC device transmits the speed information of the vehicle to the GNSS using an analog signal, distortion may occur in the speed information of the vehicle. If distorted speed information of vehicle is used in DR calculation, errors may occur in vehicle position indication and a navigation function. Therefore, it is necessary to transmit the speed information of the vehicle to the GNSS so that the speed information of the vehicle is not distorted.

SUMMARY

According to embodiments of the present disclosure, a method for transmitting speed information of a vehicle includes receiving a first speed information of the vehicle from an electronic stability control (ESC) device, the first speed information being information based on a plurality of wheels of the vehicle, averaging the first speed information, converting the averaged first speed information into a second speed information of the vehicle, based on a first period and outputting the second speed information, based on a second period and a minimum output frequency, in which the first speed information is a digital signal and the second speed information is an analog signal.

According to embodiments of the present disclosure, an apparatus for transmitting speed information of a vehicle includes a non-transitory memory and at least one processor, the at least one processor being configured to receive a first speed information of the vehicle from an electronic stability control (ESC) device, the first speed information being information based on a plurality of wheels of the vehicle, average the first speed information, convert the averaged first speed information into a second speed information of the vehicle, based on a first period and output the second speed information, based on a second period and a minimum output frequency, in which the first speed information is a digital signal and the second speed information is an analog signal.

According to embodiments of the present disclosure, a non-transitory computer-readable recording medium in which an instruction is stored, wherein the instruction causes, when executed by a computer, the computer to perform: receiving a first speed information of a vehicle from an electronic stability control (ESC) device, the first speed information being information based on a plurality of wheels of the vehicle, averaging the first speed information, converting the averaged first speed information into a second speed information of the vehicle, based on a first period and outputting the second speed information, based on a second period and a minimum output frequency, wherein the first speed information is a digital signal and the second speed information is an analog signal.

BRIEF DESCRIPTION OF THE DRAWINGS

FIG. 4 is a diagram illustrating a method in which an MCU converts speed information of vehicle from a digital signal to an analog signal using correction processing, according to an embodiment of the present disclosure.

DETAILED DESCRIPTION

Figure 1:
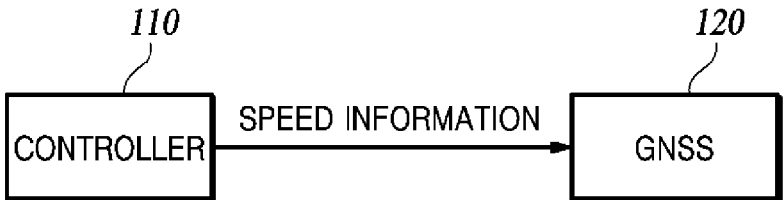
FIG. 1 is a diagram illustrating a related art method for transmitting speed information of vehicle.

In view of the above, the present disclosure transmits speed information of vehicle using a digital signal.

In addition, according to an embodiment, it is possible to block noise intervention in speed information of vehicle.

In addition, according to an embodiment, a correction algorithm may be applied to speed information of vehicle transmitted using a digital signal.

In addition, according to an embodiment, the accuracy of dead reckoning (DR) calculation may be improved.

In addition, according to an embodiment, navigation operation performance may be improved and costs may be reduced.

The problems to be solved by the present disclosure are not limited to the problems mentioned above, and other problems not mentioned may be clearly understood by those skilled in the art from the description below.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

FIG. 1 is a diagram illustrating a related art method for transmitting speed information of vehicle.

Referring to FIG. 1, a controller 110 in a vehicle may transmit speed information of vehicle to a global navigation satellite system (GNSS) 120. The controller 110 may transmit the speed information of the vehicle to the GNSS 120 using a hardwire transmission method. As an example, the speed information of the vehicle may correspond to vehicle wheel information. The hardwire transmission method may correspond to an analog signal transmission method. When the controller 110 transmits the speed information of the vehicle to the GNSS 120, noise may be introduced into the speed information of the vehicle. If noise is introduced, distortion may occur in the speed information of the vehicle. Noise may be introduced into the speed information of the vehicle due to mutual noise influence between wires. For example, when the controller 110 transmits speed information having a frequency of 5 Hz to the GNSS 120, the speed information may be changed to a frequency of 7 Hz due to noise inflow.

Figure 2:
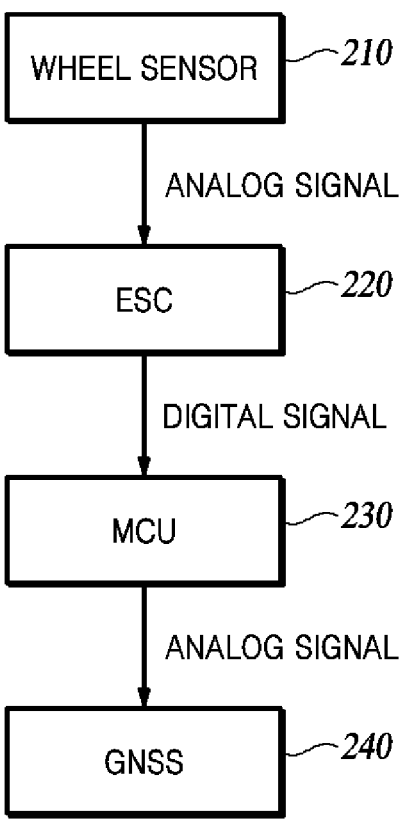
FIG. 2 is a diagram illustrating a method for transmitting speed information of vehicle, according to an embodiment of the present disclosure.

FIG. 2 is a diagram illustrating a method for transmitting speed information of vehicle according to an embodiment of the present disclosure.

Referring to FIG. 2, the wheel sensor 210 may transmit speed information of vehicle to an electronic stability control (ESC) device 220. A wheel sensor 210 may be present within a vehicle wheel. The wheel sensor 210 may transmit the speed information of vehicle to the ESC device 220 using an analog signal transmission method. The ESC device 220 may convert the speed information of vehicle from an analog signal to a digital signal. The ESC device 220 may transmit the speed information of vehicle to a micro-controller unit (MCU) 230 using vehicle digital communication. As an example, the vehicle digital communication may correspond to controller area network (CAN) or Ethernet.

The MCU 230 may receive the speed information of vehicle, which is a digital signal, from the ESC device 220. The MCU 230 may exist inside an audio video navigation system (AVN). The MCU 230 may be responsible for vehicle communication within the AVN. The MCU 230 may convert the speed information of vehicle, which is a digital signal, into a frequency. The MCU 230 may convert the digital signal into an analog signals. The MCU 230 may transmit the speed information of vehicle to a GNSS 240 using an analog signal transmission method. The GNSS 240 may perform dead reckoning (DR) by combining the speed information of vehicle, which is an analog signal, and information input from a gyro sensor or acceleration sensor. DR may be performed in an area in which a satellite radio frequency (RF) signal is not preset or an area with low sensitivity. For example, an area with no RF signals or low sensitivity may correspond to underground parking lots, tunnels, or urban building forests.

Figure 3:
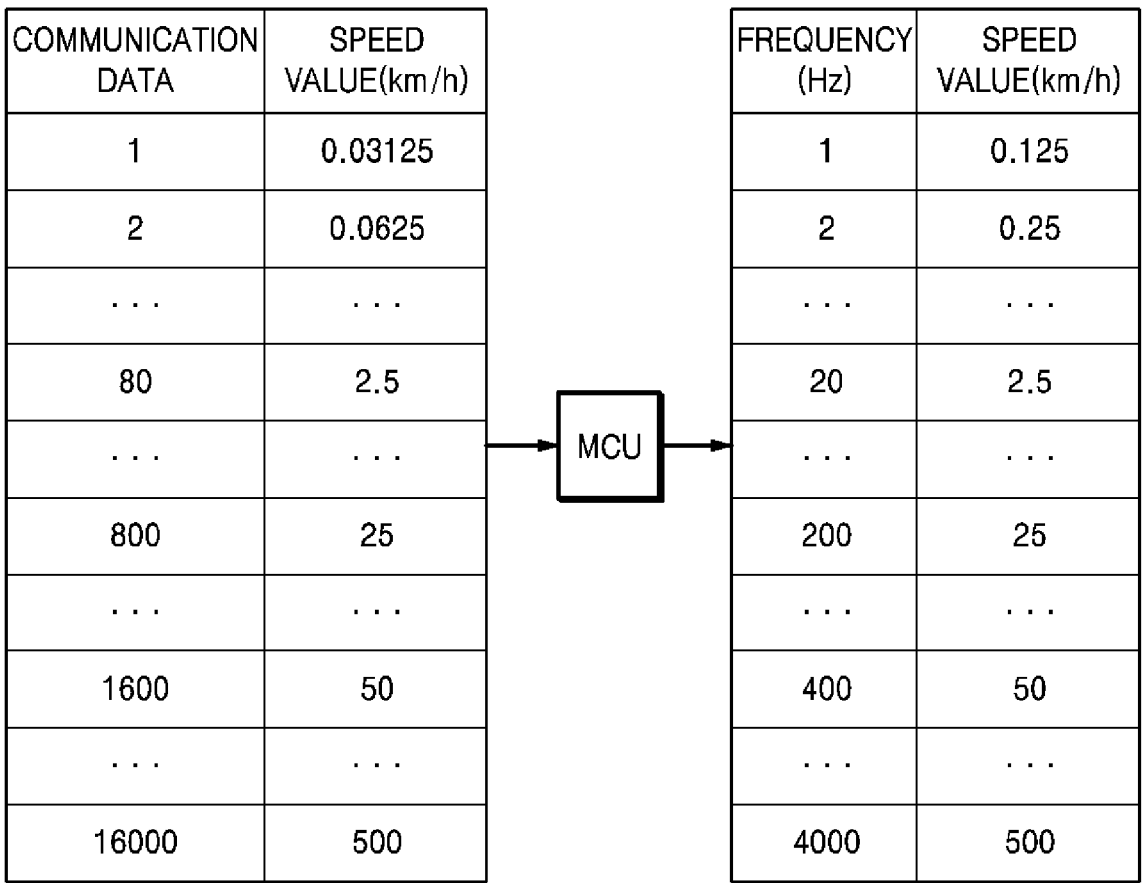
FIG. 3 is a diagram illustrating a method in which a micro-controller unit (MCU) converts speed information of vehicle from a digital signal to an analog signal, according to an embodiment of the present disclosure.

FIG. 3 is a diagram illustrating a method in which an MCU converts speed information of vehicle from a digital signal to an analog signal, according to an embodiment of the present disclosure.

Referring to FIG. 3, the MCU may receive vehicle communication data, which is a digital signal. The MCU may receive the vehicle communication data from the ESC device. For example, if the maximum speed of the vehicle is 500 km/h, the vehicle communication data may correspond to integer values from 1 to 16000. A vehicle speed per unit of the vehicle communication data may be calculated as 0.03125 km/h. The MCU may receive the vehicle communication data at regular intervals. As an example, the MCU may receive the vehicle communication data every 50 ms. The MCU may convert the vehicle communication data into a frequency. The MCU may output the frequency at regular intervals. As an example, the MCU may convert and output the frequency value at a period of 50 ms. In the case of a low-speed signal, if the MCU outputs a frequency for the low-speed signal, the MCU may not be able to output other frequencies until the MCU outputs the corresponding frequency. For example, if the MCU outputs a 1 Hz frequency, the MCU may not be able to output a changed frequency even if the vehicle speed information is changed for 1 s which is a time duration in which the 1 Hz frequency is output. As a result, when a vehicle moves at a low speed and the MCU outputs a frequency for a low-speed signal, it is difficult to immediately reflect a speed change, so an error of tens of meters may occur.

To prevent such errors, the minimum outputtable frequency may be set when converting data. As an example, the MCU may set the minimum outputtable frequency to 20 Hz and output 0 Hz without outputting the frequency for vehicle communication data below a certain value. In this case, the MCU may process the frequency conversion of input data once every 50 ms. For example, when the MCU receives 2 as vehicle communication data, since the minimum outputtable frequency is 20 Hz, so the MCU may output a 0 Hz frequency rather than a 2 Hz frequency. For example, when the MCU receives 80 as vehicle communication data, the MCU may output a 20 Hz frequency through conversion logic.

For example, when the MCU receives 800 as vehicle communication data, the MCU may output a 200 Hz frequency through conversion logic. For example, when the MCU receives 1600 as vehicle communication data, the MCU may output a 400 Hz frequency through conversion logic. For example, when the MCU receives 16000 as vehicle communication data, the MCU may output a 4000 Hz frequency through conversion logic. When performing such output conversion, correction processing may be required for a portion in which the output frequency of 20 Hz or less is output as 0 Hz. In addition, correction processing may be necessary for a portion of vehicle communication data that have not been converted to an integer multiple.

FIG. 4 is a diagram illustrating a method in which an MCU converts speed information of vehicle from a digital signal to an analog signal using correction processing, according to an embodiment of the present disclosure.

Referring to FIG. 4, vehicle communication data input from four wheel sensors may be averaged. As an example, the MCU may set the minimum outputtable frequency to 20 Hz. When the MCU receives 80 as vehicle communication data, the MCU may output a frequency of (vehicle communication data/80)×20. Since the minimum outputtable frequency for 50 ms is 20 Hz, if the MCU receives vehicle communication data corresponding to less than 20 Hz, the corresponding vehicle communication data may be accumulated. That is, if the vehicle communication data input to the MCU is less than 80, the corresponding vehicle communication data may be accumulated. If the vehicle communication data input to the MCU is greater than 80, the MCU may output a frequency of (vehicle communication data/80)×20. Here, a quotient value of (vehicle communication data/80) is multiplied by 20, and the remaining value may be reflected when outputting a next frequency.

For example, at 0 ms, when the MCU receives 3 as vehicle communication data, the MCU may accumulate vehicle communication data 3 and output a 0 Hz frequency. At 50 ms, if the MCU receives 5 as vehicle communication data, the MCU may accumulate the vehicle communication data 5 and output a 0 Hz frequency. At 100 ms, if the MCU receives 15 as vehicle communication data, the MCU may accumulate the vehicle communication data 15 and output a 0 Hz frequency. At 150 ms, if the MCU receives 50 as vehicle communication data, the MCU may accumulate the vehicle communication data 50 and output a 0 Hz frequency. At 200 ms, if the MCU receives 80 as vehicle communication data, since the accumulated vehicle communication data is 153, the MCU may output a 20 Hz frequency and accumulate the remaining vehicle communication data of 73.

At 250 ms, when the MCU receives 150 as vehicle communication data, since the accumulated vehicle communication data is 223, the MCU may output a 40 Hz frequency and accumulate the remaining vehicle communication data of 63. At 300 ms, when the MCU receives 200 as vehicle communication data, since the accumulated vehicle communication data is 263, the MCU may output a 60 Hz frequency and accumulate the remaining vehicle communication data of 23. At 350 ms, when the MCU receives 70 as vehicle communication data, since the accumulated vehicle communication data is 93, the MCU may output a 20 Hz frequency and accumulate the remaining vehicle communication data of 13. At 400 ms, when the MCU receives 40 as vehicle communication data, since the accumulated vehicle communication data is 53, the MCU may output 0 Hz frequency and accumulate vehicle communication data 53. At 450 ms, when the MCU receives 40 as vehicle communication data, since the accumulated vehicle communication data is 93, the MCU may output a 20 Hz frequency and accumulate the remaining vehicle communication data of 13.

FIGS. 5A, 5B, 5C, and 5D are diagrams illustrating a method in which an MCU converts speed information of vehicle from a digital signal to an analog signal using a correction algorithm, according to an embodiment of the present disclosure.

Figure 5A:
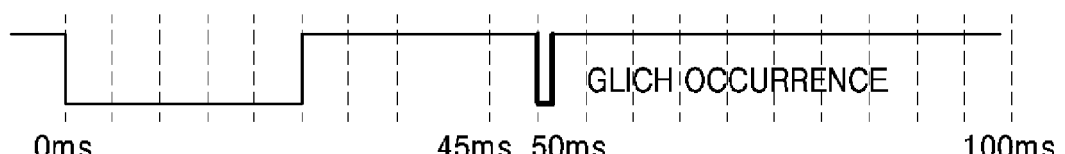
FIGS. 5A, 5B, 5C, and 5D are diagrams illustrating a method in which an MCU converts speed information of vehicle from a digital signal to an analog signal using a correction algorithm, according to an embodiment of the present disclosure.

Referring to FIG. 5A, as an example, the MCU may receive vehicle communication data at a period of 50 ms and output a frequency at a period of 50 ms. The MCU may process conversion logic in 5 ms cycles. In a case in which the 20 Hz frequency is scheduled to be output in the period from 0 ms to 50 ms and the 0 Hz frequency is scheduled to be output in the period from 50 ms to 100 ms, if the frequency output setting is delayed by even 1 ms at the time of 50 ms, the 20 Hz frequency output in the period from 0 ms to 50 ms may start in the period of 50 ms to 100 ms. Accordingly, a glitch may occur and an unintended output may occur at 50 ms.

Figure 5B:
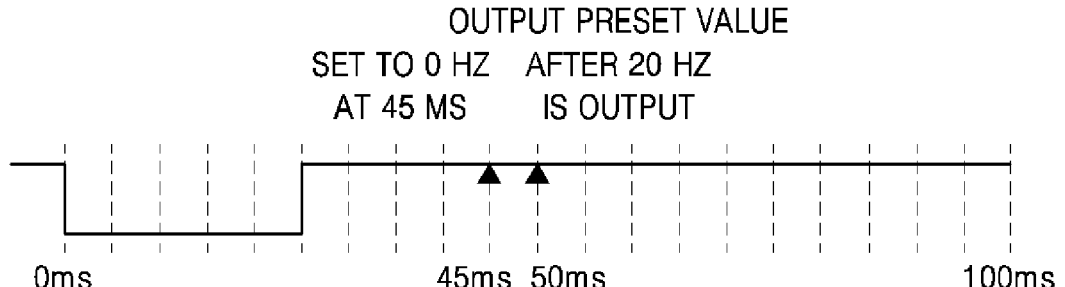

Referring to FIG. 5B, as an example, the MCU may receive vehicle communication data at a period of 50 ms and output a frequency at a period of 50 ms. The MCU may process conversion logic in 5 ms cycles. In a case in which a 20 Hz frequency is scheduled to be output in the period of 0 ms to 50 ms and 0 Hz is scheduled to be output in the period of 50 ms to 100 ms, the frequency may be set to 0 Hz in the period of 45 ms to 50 ms to prevent glitches. Accordingly, no unintended output occurs at 50 ms.

Figure 5C:
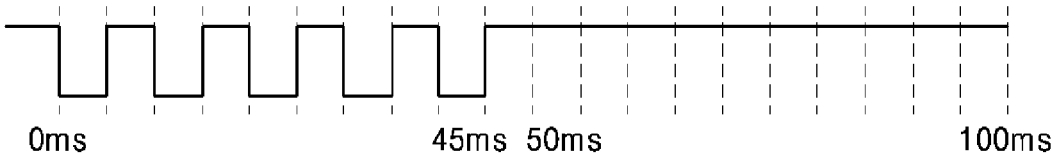

Referring to FIG. 5C, as an example, the MCU may receive vehicle communication data at a period of 50 ms and output a frequency at a period of 50 ms. The MCU may process conversion logic in 5 ms cycles. In a case in which a 100 Hz frequency is scheduled to be output in the period of 0 ms to 50 ms and 0 Hz is scheduled to be output in the period of 50 ms to 100 ms, the frequency may be set to 0 Hz in the period of 45 ms to 50 ms to prevent glitches. Accordingly, no unintended output occurs at 50 ms.

Figure 5D:
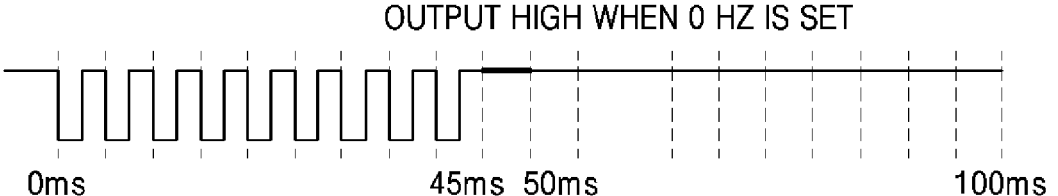

Referring to FIG. 5D, as an example, the MCU may receive vehicle communication data at a period of 50 ms and output a frequency at a period of 50 ms. The MCU may process conversion logic in 5 ms cycles. In a case in which a 200 Hz frequency is scheduled to be output in the period of 0 ms to 50 ms and 0 Hz is scheduled to be output in the period of 50 ms to 100 ms, if the frequency is set to 0 Hz in the period of 45 ms to 50 ms, the intended 200 Hz frequency may not be output but 0 Hz may be output. This is because no additional pulse is generated in the period of 45 ms to 50 ms only at frequencies below 100 Hz. Therefore, in order to prevent glitches, the frequency may be set to 0 Hz in the period of 45 ms to 50 ms only when the output frequency in the period of 0 ms to 50 ms is 100 Hz or less.

Figure 6:
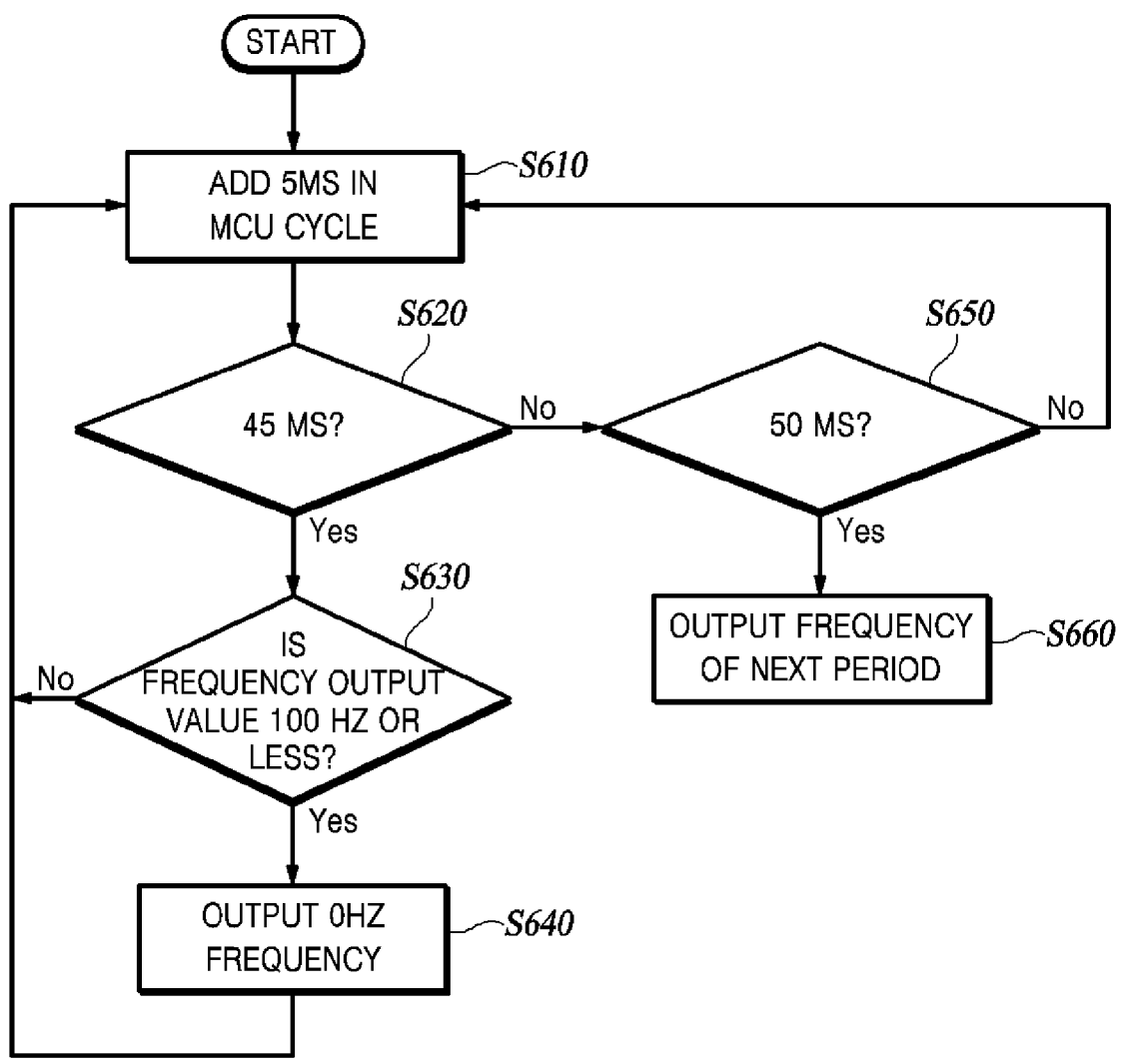
FIG. 6 is a diagram illustrating a process in which an MCU outputs a 0 Hz frequency to prevent glitches, according to an embodiment of the present disclosure.

FIG. 6 is a diagram illustrating a process in which the MCU outputs a 0 Hz frequency to prevent glitches, according to an embodiment of the present disclosure.

Referring to FIG. 6, the MCU may add 5 ms in the cycle (S610). The MCU may process conversion logic in 5 ms cycles. Before the MCU adds 5 ms, a frequency output value and 5 ms timing count may be initialized. The MCU may determine whether a current time corresponds to 45 ms (S620). If the current time corresponds to 45 ms (S620—YES), the MCU may determine whether a frequency output value between 0 ms and 45 ms is 100 Hz or less (S630). If the frequency output value between 0 ms and 45 ms is not 100 Hz or less (S630—NO), the MCU may add 5 ms in the cycle (S610). Here, the MCU may output the originally output frequency between 45 ms and 50 ms. If the frequency output value between 0 ms and 45 ms is 100 Hz or less (S630—YES), the MCU may output a 0 Hz frequency between 45 ms and 50 ms (S640).

If a current time does not correspond to 45 ms (S620—NO), the MCU may determine whether the current time corresponds to 50 ms (S650). If the current time does not correspond to 50 ms (S650—NO), the MCU may add 5 ms in the cycle (S610). Here, the MCU may output the originally output frequency. If the current time corresponds to 50 ms (S650—YES), the MCU may output a frequency of the next cycle (S660). The frequency of the next cycle is a frequency that refers to input vehicle communication data. The MCU may output a frequency between 50 ms and 100 ms.

Figure 7:
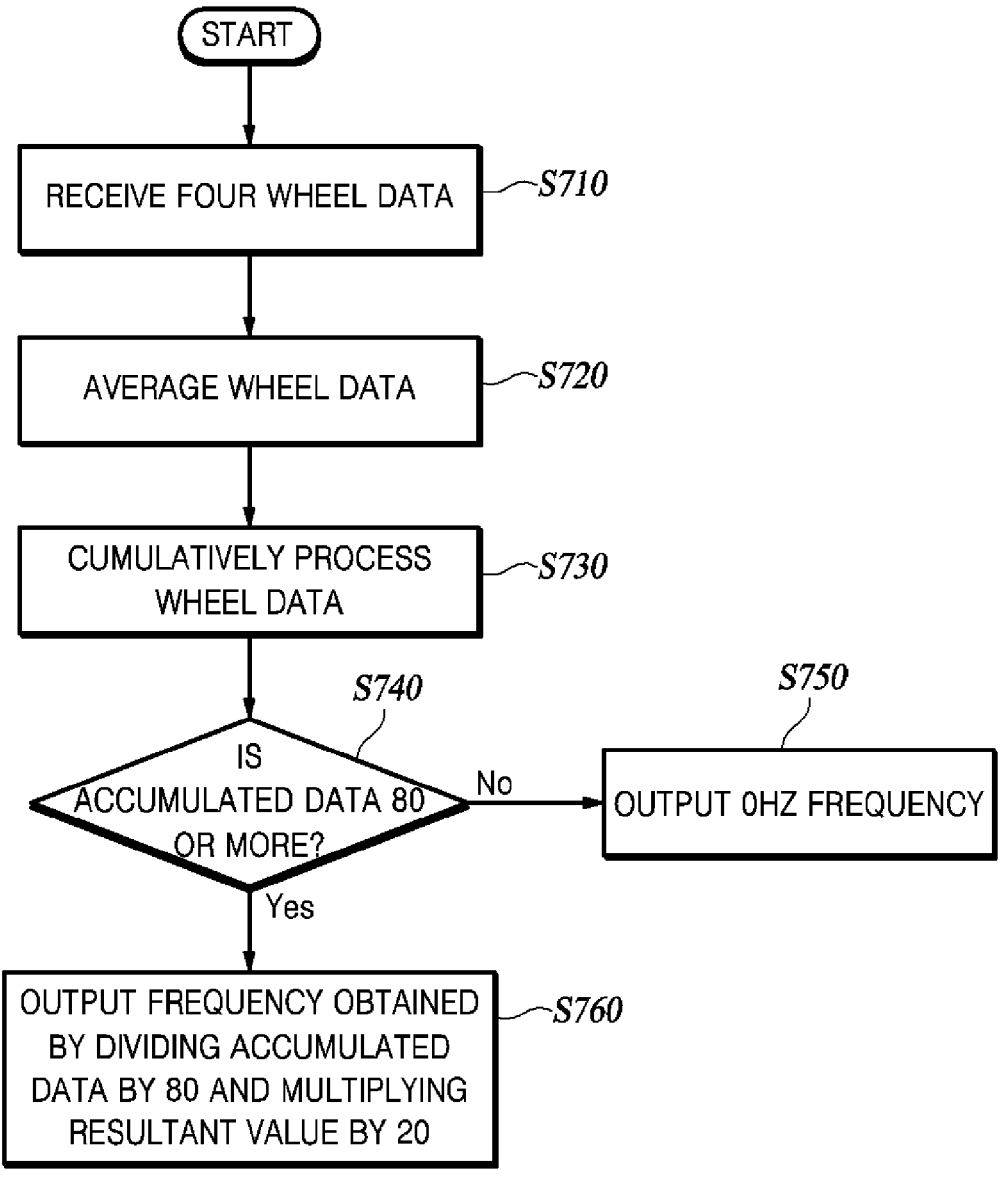
FIG. 7 is a diagram illustrating a process in which an MCU outputs speed information of vehicle as a frequency, according to another embodiment of the present disclosure.

FIG. 7 is a diagram illustrating a process in which the MCU outputs speed information of vehicle as a frequency, according to another embodiment of the present disclosure.

Referring to FIG. 7, the MCU may receive four wheel data (S710). The MCU may initialize a wheel data average and an average cumulative value before receiving the four wheel data. The four wheel data may correspond to four vehicle communication data. The MCU may average the four wheel data (S720). The MCU may average the four wheel data only when three or more of the four wheel data are valid. The MCU may cumulatively process wheel data (S730). The MCU may determine whether the accumulated data is 80 or more (S740). If the accumulated data is not 80 or more (S740—NO), the MCU may output a 0 Hz frequency (S750). If the accumulated data is 80 or more (S740—YES), the MCU may output a frequency obtained by dividing the accumulated data by 80 and multiplying a resultant value by 20 (S760). In this case, the remaining data may be accumulated.

Figure 8:
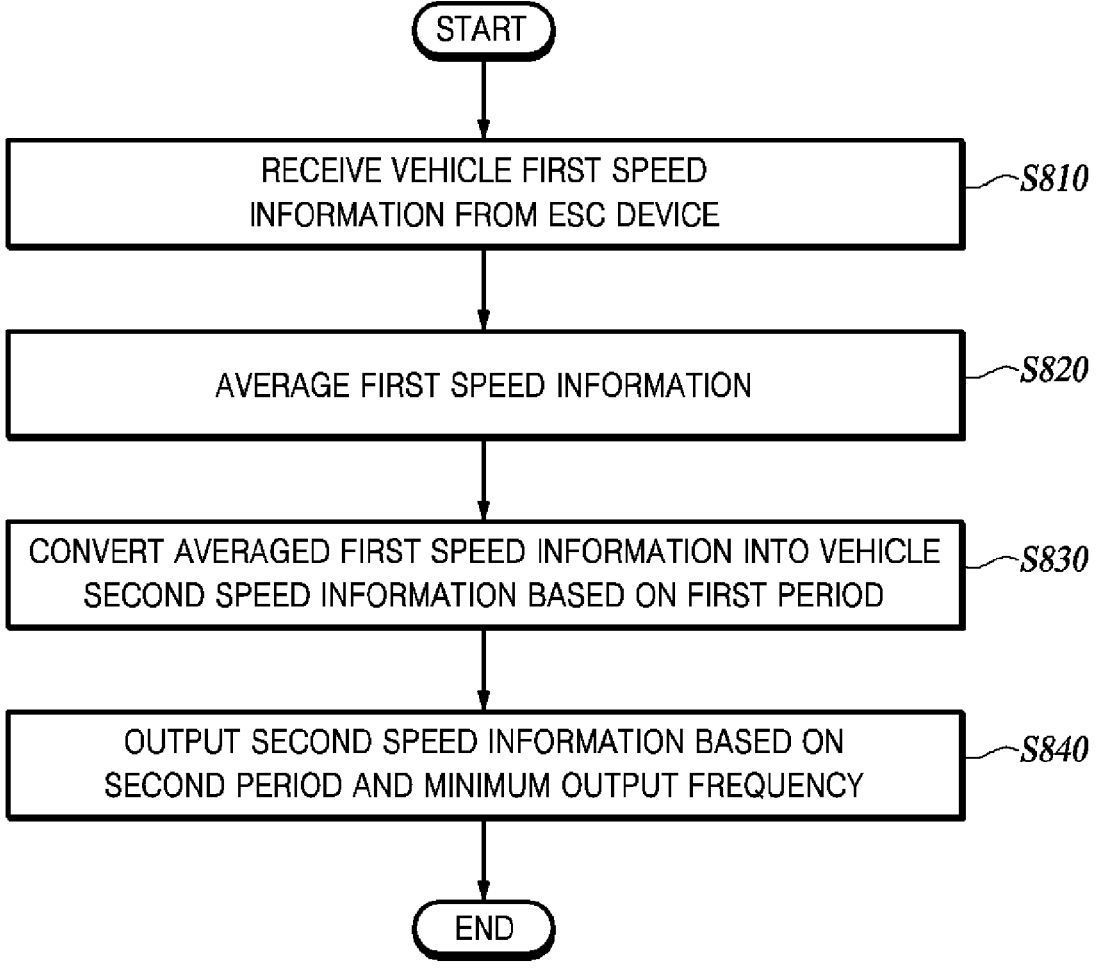
FIG. 8 is a diagram illustrating a method for transmitting speed information of vehicle, according to an embodiment of the present disclosure.

FIG. 8 is a diagram illustrating a method for transmitting speed information of vehicle, according to an embodiment of the present disclosure.

Referring to FIG. 8, an apparatus for transmitting speed information of vehicle may receive a first speed information of vehicle from an ESC device (S810). The apparatus for transmitting speed information of vehicle may include an MCU. The apparatus for transmitting speed information of vehicle may average the first speed information (S820). The averaging of the first speed information may include averaging the first speed information when information based on a predetermined number of wheels among information based on a plurality of wheels of the vehicle is valid. The first speed information may correspond to the information based on the plurality of wheels of the vehicle. The apparatus for transmitting speed information of vehicle may convert the averaged first speed information based on a first period into a second speed information of the vehicle (S830). The apparatus for transmitting speed information of vehicle may output second speed information based on the second period and minimum output frequency (S840). The outputting of the second speed information may include outputting a 0 Hz frequency based on a first period, a second period, and the current output frequency. The outputting of the second speed information may include outputting a 0 Hz frequency when the second speed information is less than the minimum output frequency.

The first speed information may be a digital signal and the second speed information may be an analog signal. The MCU may transmit the second speed information to the GNSS. The first speed information may be received based on CAN or Ethernet. The first speed information may be received based on the second period.

According to the present disclosure, there is an effect of transmitting speed information of vehicle using a digital signal.

In addition, according to an embodiment, there is an effect of blocking noise intervention in speed information of vehicle.

In addition, according to an embodiment, there is an effect of applying a correction algorithm to speed information of vehicle transmitted using a digital signal.

In addition, according to an embodiment, there is an effect of improving the accuracy of dead reckoning (DR) calculation.

In addition, according to an embodiment, there is an effect of improving navigation performance and reducing costs.

The effects that may be obtained from the present disclosure are not limited to the effects mentioned above, and other effects not mentioned may be clearly understood by those skilled in the art from the description below.

Each element of the apparatus or method in accordance with the present disclosure may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for transmitting speed information of a vehicle, the method comprising:

receiving a first speed information of the vehicle from an electronic stability control (ESC) device, the first speed information being information based on a plurality of wheels of the vehicle;

averaging the first speed information;

converting the averaged first speed information into a second speed information of the vehicle, based on a first period; and outputting the second speed information, based on a second period and a minimum output frequency, wherein the first speed information is a digital signal and the second speed information is an analog signal, and wherein the outputting the second speed information comprises:

outputting a 0 Hz frequency based on the first period, the second period, and a current output frequency.

2. The method of claim 1, further comprising:

transmitting the second speed information to a global navigation satellite system (GNSS).

3. The method of claim 1, wherein the first speed information is received based on a controller area network (CAN) or Ethernet, and the first speed information is received based on the second period.

4. The method of claim 1, wherein the averaging the first speed information comprises:

averaging the first speed information when information based on a predetermined number of wheels among the information based on the plurality of wheels of the vehicle is valid.

5. The method of claim 1, wherein the outputting the second speed information comprises:

outputting a 0 Hz frequency when the second speed information is less than the minimum output frequency.

6. An apparatus for transmitting speed information of vehicle of a vehicle, the apparatus comprising:

a non-transitory memory; and at least one processor, wherein the at least one processor is configured to:

receive a first speed information of the vehicle from an electronic stability control (ESC) device, the first speed information being information based on a plurality of wheels of the vehicle;

average the first speed information;

convert the averaged first speed information into a second speed information of the vehicle, based on a first period; and output the second speed information, based on a second period and a minimum output frequency, wherein the first speed information is a digital signal and the second speed information is an analog signal, and wherein the at least one processor outputs a 0 Hz frequency based on the first period, the second period, and a current output frequency.

7. The apparatus of claim 6, wherein the at least one processor is further configured to transmit the second speed information to a global navigation satellite system (GNSS).

8. The apparatus of claim 6, wherein the first speed information is received based on a controller area network (CAN) or Ethernet, and the first speed information is received based on the second period.

9. The apparatus of claim 6, wherein the at least one processor averages the first speed information when information based on a predetermined number of wheels among the information based on the plurality of wheels of the vehicle is valid.

10. The apparatus of claim 6, wherein the at least one processor outputs a 0 Hz frequency when the second speed information is less than the minimum output frequency.

11. A non-transitory computer-readable recording medium in which an instruction is stored, wherein the instruction causes, when executed by a computer, the computer to perform:

receiving a first speed information of a vehicle from an electronic stability control (ESC) device, the first speed information being information based on a plurality of wheels of the vehicle;

averaging the first speed information;

converting the averaged first speed information into a second speed information of the vehicle, based on a first period; and outputting the second speed information, based on a second period and a minimum output frequency, wherein the first speed information is a digital signal and the second speed information is an analog signal, and wherein the instruction further causes the computer to output a 0 Hz frequency based on the first period, the second period, and a current output frequency.

* * * * *